United States Patent [19]

Franklin

[11] Patent Number: 5,140,052
[45] Date of Patent: Aug. 18, 1992

[54] HYDROLYZED DIALKYL DICARBONATES AS BLOWING AGENTS FOR POLYMERS

[75] Inventor: Ralph Franklin, Danbury, Conn.

[73] Assignee: Akzo N.V., Arnhem, Netherlands

[21] Appl. No.: 829,647

[22] Filed: Feb. 3, 1992

Related U.S. Application Data

[60] Continuation-in-part of Ser. No. 724,687, Jul. 2, 1991, Pat. No. 5,086,083, which is a continuation-in-part of Ser. No. 622,034, Dec. 4, 1990, Pat. No. 5,030,664, which is a division of Ser. No. 353,852, May 18, 1989, Pat. No. 4,983,320.

[51] Int. Cl.$^5$ ............................................. C08J 9/08
[52] U.S. Cl. ........................................ 521/129; 521/82;
   521/94; 521/97; 521/130; 521/178; 521/181;
   521/182
[58] Field of Search ............... 521/82, 94, 97, 129,
   521/130, 178, 181, 182

[56] References Cited

U.S. PATENT DOCUMENTS

| | | | |
|---|---|---|---|
| 3,573,232 | 3/1971 | Kloker et al. | 521/129 |
| 3,573,233 | 3/1971 | Alfes et al. | 521/129 |
| 4,070,310 | 1/1978 | Schneider et al. | 521/129 |
| 4,110,273 | 8/1978 | Cohen | 521/59 |
| 4,297,442 | 10/1981 | Blahak | 521/107 |
| 4,983,320 | 1/1991 | Franklin et al. | 521/129 |
| 5,030,664 | 7/1991 | Franklin et al. | 521/129 |
| 5,086,083 | 2/1992 | Franklin et al. | 521/129 |

FOREIGN PATENT DOCUMENTS 053399  5/1972  Fed. Rep. of Germany.

OTHER PUBLICATIONS

"Analysis of the Rate of Degradation of Diethyl Dicarbonate By Gas Chromatography" by Drozd et al., vol. 40 (1975)–Journal of Food Science–1109.

*Primary Examiner*—Morton Foelak
*Attorney, Agent, or Firm*—Louis A. Morris; James K. Poole

[57] ABSTRACT

An improved method of using polymer compositions to produce foamed plastics, wherein a major, auxiliary source of blowing agent for the foam is the decomposition of dialkyl dicarbonates. The dialkyl dicarbonates can be decomposed over temperatures ranging from about 10° C. to about 45° C. when used in combination with particular tertiary amine decomposition catalysts. Enhanced production of carbon dioxide is obtained by the addition of water.

32 Claims, 5 Drawing Sheets ns. No. 07/622,034, filed Dec. 4, 1990 and
HYDROLYZED DIALKYL DICARBONATES AS BLOWING AGENTS FOR POLYMERS

CROSS REFERENCE TO RELATED APPLICATIONS

This application is a continuation-in-part of our prior copending application Ser. No. 07/724,687, filed Jul. 2, 1991, to issue Feb. 4, 1992 as U.S. Pat. No. 5,086,083, which is a continuation-in-part of our prior copending application Ser. No. 07/622,034, filed Dec. 4, 1990 and now as U. S. Pat. No. 5,030,664 and incorporated herein by reference, which is a divisional of our prior application Ser. No. 07/353,852, now U. S. Pat. No. 4,983,320.

BACKGROUND OF THE INVENTION

1. Field of the Invention

The present invention pertains to the use of dialkyl dicarbonates combined with decomposition catalysts as blowing agents for polymeric compositions which rapidly progress from a fluid to a rigid physical form over a time-temperature profile which is inadequate to provide substantial thermal decomposition of the dicarbonates.

2. Background of the Invention

Blowing agents are used in combination with polymers to produce polymeric foams. Polymeric foams having broad application include, for example, urethane foams, polyester foams, and foams comprising polyvinyl chloride. Blowing agents for polymers fall into two categories, chemical blowing agents and physical blowing agents. Commercially used chemical blowing agents are dominated by azodicarbonamide and physical blowing agents by chlorofluorocarbons and methylene dichloride; both of these compound types have toxicological and ecological problems associated with them.

It would be desirable to have a blowing agent for polymers which comprises carbon dioxide, since this blowing agent is non-toxic and environmentally acceptable. Many organic compounds when heated evolve carbon dioxide; unfortunately, the temperature at which this occurs precludes their use in many polymeric foaming applications. However, there are particular organic compounds which can be made to decompose, releasing carbon dioxide, at lower temperatures when used in combination with a suitable decomposition catalyst.

U.S. Pat. No. 3,573,232 to Kloeker et al., issued Mar. 30, 1971, describes a process for the production of polyester foamed materials. A copolymerizable mixture of unsaturated polyesters and monomeric vinyl compound employs as a foaming agent a carbonic acid ester anhydride. A polyvalent metal compound is used as a catalyst to cause decomposition of the anhydride without the application of a substantial amount of heat.

U.S. Pat. No. 3,573,233 to Krefeid et al., issued Mar. 30, 1971, discloses a process of producing foamed materials from a copolymerizable mixture of unsaturated polyesters and a monomeric polymerizable vinyl compound employing as a foaming agent a carbonic acid ester anhydride. Particular amine compounds consisting of a primary or an acyclic or cyclic secondary or an acyclic or cyclic tertiary amine with alkyl, alkenyl, or alkenyl radicals or its quaternary ammonium base or a primary or secondary N-monoaryl amine are used as catalysts to cause decomposition of the anhydride without the application of a substantial amount of heat.

U.S. Pat. No. 4,070,310 to Schneider et al., issued Jan. 24, 1978, describes the use of a process for the production of polyurethane foams preferably having a compact surface, in which process a mixture of polyisocyanates and compounds which liberate carbon dioxide under the catalytic influence of basic compounds is reacted with organic compounds containing hydrogen atoms which are reactive with isocyanate groups in a closed mould. The organic compounds containing reactive hydrogen atoms are mixed with basic compounds and/or have basic compounds chemically built into them; the reaction can be carried out in the presence of auxiliary agents and additives which are known in the chemistry of polyurethane foams. The reaction which generates carbon dioxide is carried out in the presence of water and/or organic blowing agent. The presence of the carbon dioxide increases the time period the foam is in a low viscosity state, thus improving the flow properties of the foamable mixture. The patent indicates in the paragraph bridging columns 2 and 3 that the compounds releasing carbon dioxide are not used as blowing agents and would be unsuitable as sole blowing agents.

The organic compounds which split off carbon dioxide under the catalytic influence of basic compounds include pyrocarbonic acid dimethylester, pyrocarbonic acid diethyl ester, pyrocarbonic acid dibutyl ester, pyrocarbonic acid dioctadecyl ester, acetic acid - carbonic acid ethyl ester anhydride, propionic acid - carbonic acid - ethyl ester anhydride, sebacic acid - bis (carbonic acid methyl ester) - anhydride, adipic acid bis - (carbonic acid methyl ester) - anhydride, crotonic acid carbonic acid - methyl ester - anhydride and the like. The use of carbonic acid ester anhydrides or mixed anhydrides and basic compounds to produce carbon dioxide is said to be unsuitable as the sole blowing agent for the foam, particularly for molded foam products.

Carbonic acid esters and ester anhydrides are used in combination with any inorganic or organic compounds which are basic in reaction, to produce the carbon dioxide. Examples of basic compounds used as decomposition catalysts include alkali metal hydroxide or alcoholates such as sodium hydroxide, potassium hydroxide, sodium ethylate and potassium methylate and salts which are basic in reaction. Preferred basic compounds are tertiary amines. Examples of such amines include triethylamine, dimethylbenzylamine, permethylated diethylene triamine and triethylenediamine.

U.S. Pat. No. 4,110,273 to Cohnen et al., issued Aug. 29, 1978 discloses a blowing agent composition consisting of 1,4 butanediol-bis-(carbonic acid ester-benzoic acid anhydride) and silicon dioxide. The silicon dioxide is credited with reducing the decomposition temperature of the anhydride while increasing the yield of gas substantially. This blowing agent is used for foaming thermoplastics such as polycarbonates, polyesters, polyamides, and mixtures of polyphenylene ethers and polystyrene at temperatures ranging from about 160° C. to about 300° C.

U.S. Pat. No. 4,297,442 to Blahak, issued Oct. 27, 1981, describes cellular elastomeric foams produced by foaming a polyurethane or a polyurethane prepolymer crosslinked with a polyamine chain lengthening agent in the presence of an organic expanding agent containing at least in part a gas forming component which reacts with the polyamine chain lengthening agent or with the products of reaction thereof with polyisocyanates and split-off gas. The organic expanding agents include organic solvents and components that decompose at temperatures above room temperature (e.g. 55° C.), splitting off gases on decomposition. Examples of expanding agents which react with amine chain lengtheners or with the reaction product of the chain lengthener with polyisocyanates include dicarbonic-acid dialkylesters, alkyl carbaminates and Leusche anhydrides.

French patent application, Publication No. 2,220,564, by Societe Nationale des Poudres et Explosifs, filed Mar. 6, 1973, describes organic dicarbonates useful as blowing agents for plastic materials. The application pertains to the use of dicarbonates comprising a t-butyl group or two isopropyl groups, since these dicarbonates are said to be transformed almost completely into gas on thermal decomposition, producing an increased yield of carbon dioxide, whereas other dicarbonates typically are not. In addition, the presence of the t-butyl group is shown to provide a pronounced reduction in the decomposition temperature of the dicarbonate, with maximum gas production taking place at about 140° C. The subject matter of this publication provides background information helpful in understanding the present invention and is hereby incorporated by reference.

The patent to Werner and Mertz, DE 2,053,399, apparently describes the use of dimethyl and diethyl dicarbonates in conjunction with water to produce foams from unsaturated polyester resins and other resins. However, the method relies on the thermal hydrolysis of the dicarbonate to produce the gas necessary for foaming and apparently does not employ a catalyst to promote the hydrolysis. The data presented by J. Drozd, J. Novak and S. Wicar in "Analysis of the Rate of Degradation of Diethyl Dicarbonate by Gas Chromatography", *J. Food Sci.*, Vol. 40, 1109 (1975), would indicate that the rate of hydrolysis of diethyl dicarbonate at ambient temperatures would be inadequate for foaming but that at elevated temperatures a more acceptable rate is obtained. The system of the present invention differs from Werner and Mertz in providing a blowing agent system, suited to the production of various polymer foams, which exploits the rapid hydrolysis of dialkyl dicarbonates at ambient temperatures in the presence of specific tertiary amine catalysts.

The majority of sources cited above use gas forming components which initiate the gas generation at temperatures only above about 90° C., with one example at about 55° C. However, there are numerous applications for which a foam generating component which is active at lower temperatures such as ambient (room) temperature is desired.

In addition to having a gas generating agent which functions at room temperatures, (over a range from about 10° C. to about 45° C.) it is important to have the time period required to create the foam be balanced with the polymer gelation time. The foam creation time period for the decomposition of pyrocarbonic acid esters and carbonic acid ester anhydrides at the processing (reaction) temperature of the polymeric composition is of critical importance in the production of foamed polymeric systems which rely on the decomposition process as a major source of blowing agent. Accordingly, it is an object of the present invention to provide improved methods of controlling the rate and amounts of gases evolved from blowing agents comprising dialkyl dicarbonates.

SUMMARY OF THE INVENTION

The present invention comprises a method of using blowing agent compositions to produce foamed plastics, wherein a major, auxiliary source of blowing agent for the foam is the decomposition of dialkyl dicarbonates in the presence of water to produce increased amounts of carbon dioxide and/or more rapid generation thereof. In particular, the invention pertains to providing well defined decomposition of the dialkyl dicarbonates over the temperature range during which a crosslinking polymer system can be expanded. The dialkyl dicarbonates can be decomposed over temperatures ranging from about 10° C. to about 200° C. when used in combination with particular amine decomposition catalysts. Selected combinations of the alkyl substituent end groups of the dicarbonate molecule and particular decomposition catalysts have been discovered which enable foam creation for polymer systems which tend to change from a fluid to a rigid, foamed form over relatively short time periods (have a short gelation period), ranging from seconds to a few minutes (e.g. 25 sec. to about 3 min.), such as polyurethanes and unsaturated polyesters. The present invention is also effective with polymer systems which foam over time periods extending to about 10 minutes.

Depending upon the amounts of water (if any) initially present in the polymer system or its precursors, sufficient water can be included to catalyze the generation of more than the expected one mole of carbon dioxide per mole of dicarbonate compound, extending to yields of two moles carbon dioxide per mole of dicarbonate compound. Similarly, when polydicarbonate compounds containing linking groups between dicarbonate groups are used, sufficient water can be added to catalyze the generation of quantities of carbon dioxide ranging from more than one mole per dicarbonate group per mole of polydicarbonate compound up to as much as two moles carbon dioxide per dicarbonate group, on the same basis. As illustrated by the examples herein, in addition to (or alternative to) increasing the volume of carbon dioxide released per mole of dicarbonate groups, water can be added in sufficient quantity to increase the rate of generation of this carbon dioxide gas to levels appropriate to the polymer systems employed.

The invention can be applied to any initially fluid polymerization system provided that the rate at which the polymer is formed, and the rate at which it changes from a viscous fluid phase to a dimensionally stable solid phase, are compatible with the rate of gas evolution from the blowing agent system. A suitable polymer system would be one which after initiation goes from a fluid state to a stabilized solid form in a relatively short time (minutes) without the need to apply any external heat. Non-limiting examples of such, systems are polyurethanes, polyisocyanurates, poly(imide-urethanes), unsaturated polyesters (and other such systems utilizing unsaturated monomers as solvent/reagent) and epoxies. Once a gel time has been determined the blowing agent composition can be adjusted, by careful selection of the components and their relative concentrations, to give the optimum evolution of gas within that time frame. The gas evolution should occur as the viscosity of the system is approaching the point of gelation to prevent premature loss of gas while the system is in a very fluid state. A thickening agent may be employed to adjust the initial viscosity of the monomer mixture if this is resulting in poor foam formation. Where it is possible to exercise some control over the rate of polymerization this can be used in conjunction with the controls of the blowing agent composition to further tune the reaction to obtain optimum foaming conditions. However, it is understood that the polymerization system should not contain any components that might significantly affect or interfere with the operation of the blowing agent system. That is, the polymerization reaction should not be inhibited by the presence of either the amine or the dicarbonate and should not contain components likely to react to any significant degree with the components of the blowing agent composition. The polymerization system should of course be compatible with the water added to hydrolyze the blowing agent; that is, the polymerization reaction should not be adversely affected by the presence of water.

The dialkyl dicarbonates which perform well in the present invention are not limited to particular alkyl substituent groups and need not be symmetrical in composition. Typical dialkyl dicarbonates which have been decomposed successfully to produce carbon dioxide gas over the above temperature range include, for example, diethyl dicarbonate, diisopropyl dicarbonate, diisobutyl dicarbonate, t-butyl methyl dicarbonate, t-butyl ethyl dicarbonate and combinations thereof. Thus, the dialkyl dicarbonates can contain alkyl groups having from 1 to about 6 carbon atoms each, preferably from 2 to 4, which can be present in various combinations. Preferred dialkyl dicarbonates include diisobutyl dicarbonate and t-butyl methyl dicarbonate which perform especially well in polyurethane applications. It is preferred to use a tertiary substituent alkyl group, in cases when it is desired to take advantage of the thermal decomposition capability of such substituent groups. Halogenated substituent alkyl groups can be used when it is desired to incorporate halogens into the foam for thermal conductivity purposes. The preferred halogens are chlorine and fluorine, with fluorine being most preferred.

In addition, polydicarbonates having a linking group which enables the generation of two molecules of carbon dioxide per molecule of dicarbonate are particularly useful. The linking group is selected from groups having the formula:

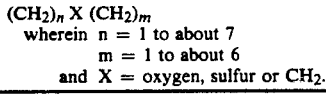

wherein n = 1 to about 7
m = 1 to about 6
and X = oxygen, sulfur or $CH_2$.

Examples of dicarbonates comprising a linking group which are expected to perform well in polyurethane foams include, for example, di t-butyl digol dicarbonate [diethylene glycol bis(t-butyl dicarbonic acid ester)] and di t-amyl digol dicarbonate, n-butyl t-butyl digol dicarbonate (diethylene glycol n-butyl t-butyl dicarbonic acid diester), t-butyl ethyl digol dicarbonate, t-butyl allyl digol dicarbonate, diisopropyl digol dicarbonate, isopropyl methyl digol dicarbonate and mixtures thereof.

The amines used to promote or catalyze decomposition of the dialkyl dicarbonates are selected from tertiary amines having at least one sterically accessible nitrogen which exhibits high nucleophilicity. Such tertiary amines include, for example, molecules having a bridgehead nitrogen wherein a cyclic structure has a nitrogen at the junction between two fused cyclic ring structures; tertiary 4-amino derivatives of pyridine; dimethyl alkylamines; and poly (dimethyl alkylamines) containing linking groups. Preferred examples of the tertiary amines referred to above include, respectively, triethylenediamine and quinuclidine; 4-(dimethylamino)pyridine and 4-(4-methyl-1-piperidinyl)-pyridine; bis(dimethylamino)-ethyl ether, tetramethylethylenediamine and tetramethyl hexamethylenediamine; and 1,3,5-tris[3(dimethylamino)propyl]hexa hydro-s-triazine. Combinations of the kinds of decomposition catalysts described above can also be used, in particular to tailor the decomposition rate over a given temperature profile.

DETAILED DESCRIPTION OF THE INVENTION

Figure 1:
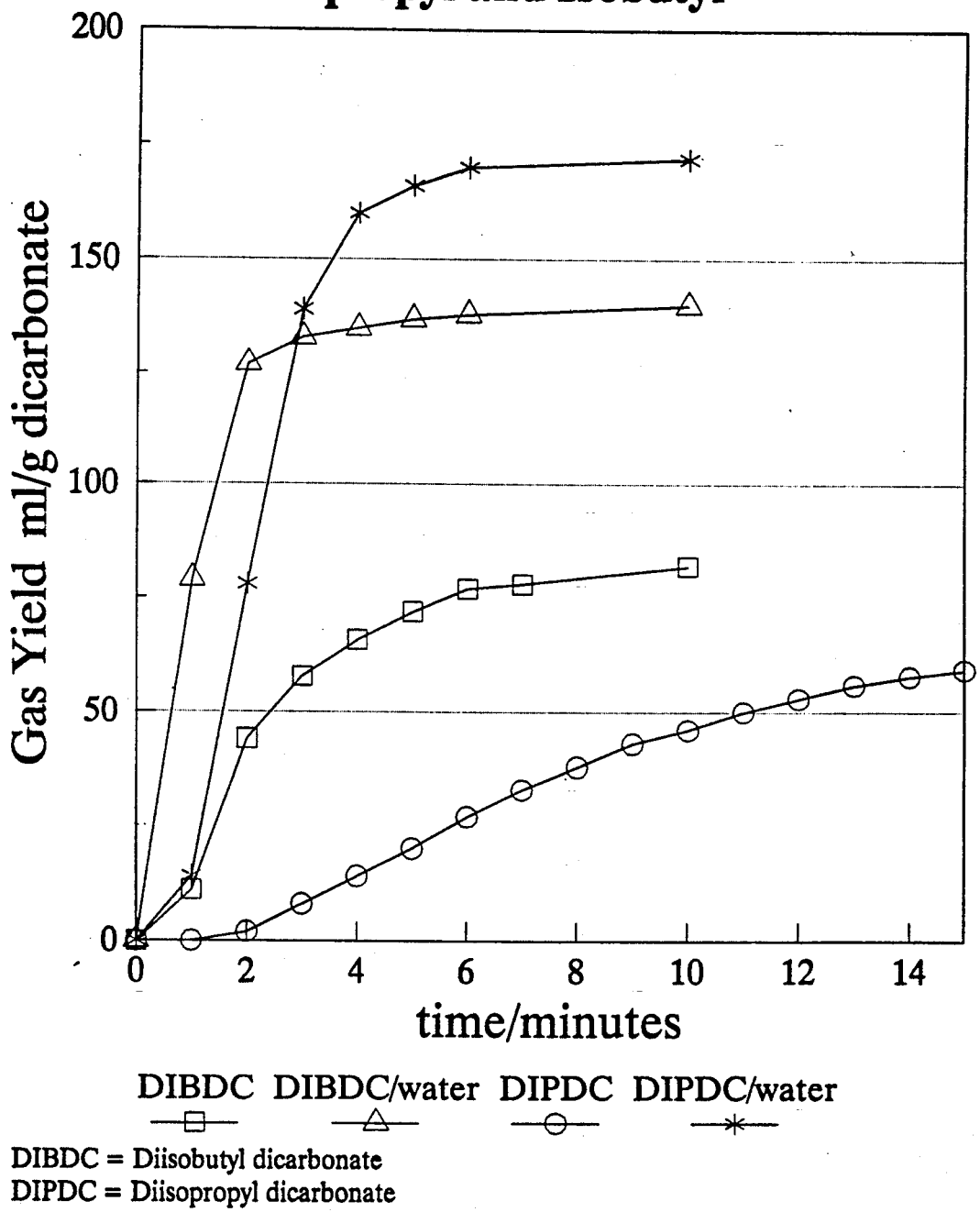
FIG. 1 illustrates that dialkyl dicarbonates catalytically decomposed in the presence of a polyol have higher reaction rates and gas yields in the presence of water.

The thermal decomposition of dicarbonates having the general structure:

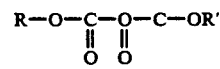

wherein R and R' are alkyl functional groups, has been studied and is considered to proceed via cleavage of an internal carbon oxygen bond followed by loss of carbon dioxide. The alkyl substituents affect both the temperature at which decomposition occurs and the gas yield. Thus, t-butyl and t-amyl dicarbonates decompose over a temperature range of about 100° C. to 195° C. with the liberation of three moles of gas (i.e., two moles carbon dioxide and one mole of an isoalkene) per mole of dicarbonate, whereas isopropyl and isobutyl dicarbonates decompose over a temperature range of about 180° C. to 250° C. and n-alkyls decompose over a range of about 200° C. to 220° C., both yielding only one mole of carbon dioxide gas per mole of dicarbonate. The facile decomposition of t-butyl dicarbonates is believed to be promoted by the formation of the t-butyl carbonium ion and its subsequent decomposition to isobutene. See, e.g., French patent application No. 2,220,564.

The mechanism for dicarbonate catalyst-assisted room temperature decomposition has been discovered to differ very significantly from the mechanism of dicarbonate thermal decomposition. Thus, a quite unexpected combination of alkyl substituents and catalyst structure provides the most rapid formation of foam in a fluid polymeric system.

The combination of dialkyl dicarbonates with certain tertiary amines results in the decomposition of the dicarbonate to a monocarbonate with the elimination of one mole of $CO_2$. By introducing water into the system a second reaction comes into effect, i.e. hydrolysis. During the amine catalyzed hydrolysis of the dicarbonate two moles of $CO_2$ are liberated with the formation of two moles of alcohol, as indicated in the equations below. Thus:

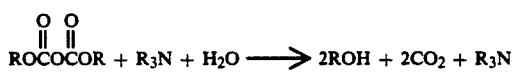

In the presence of water, with two competing reactions, it is therefore possible to form between one and two moles of $CO_2$ for every dicarbonate unit. By careful selection of the amine catalyst it is possible to control the reaction sequence such that the hydrolysis reaction dominates, thereby producing the greatest (or desired) gas yield. The rate differential between the two reactions can also be influenced by the structure of the alkyl substituents of the dicarbonate.

As with all chemical reactions, the rate of reaction may be influenced by dilution and solvent effects; this needs to be taken into consideration when developing formulations. At high dilution, reaction rates tend to be slower than at higher concentrations. Also, if one or more of the reactive components is insoluble in the solvent being used it is unlikely that any reaction will occur under normal circumstances.

When utilizing dialkyl dicarbonates to produce polymeric foams any number of the above influences can be utilized to control the amount of gas liberated, from one to two moles per dicarbonate moiety, and to tailor the rate of gas evolution necessary to produce the desired foaming effect.

Polymeric systems which react rapidly over a period of a few seconds to a few minutes to produce a gelled, substantially rigid polymer structure include polymers such as polyurethanes and unsaturated polyesters. Fillers and other appropriate additives can be included in such polymeric systems. Although the present invention can be applied to any similar polymeric systems, the examples presented below are based on polyurethanes and polyesters.

Polymeric foam systems to which the invention is applicable include polyisocyanurates, phenolics, epoxies and poly(imide-urethanes). Polyisocyanurates are produced by the rearrangement and polymerization of isocyanates or polyisocyanates. The reaction is catalyzed by numerous reagents but the preferred catalysts are tertiary amines. A review of the technology used in the production of polyisocyanurate forms is given by Edgar E. Hardy in *Plastic Foams* Vol. 1, Part 2, chapter 14 (Marcel Dekker Inc. 1973, Ed. K.C. Frisch and J. H. Saunders). In many ways the technology resembles that of polyurethane manufacture; in fact, polyurethane foam machinery can be used for the production of polyisocyanurate foams. U.S. Pat. No. 3,849,349 lists many amines that can be used in the manufacture of polyisocyanurate foams; included in that list are a number of amines also suitable for the decomposition of dicarbonates. To achieve optimum performance it may be necessary to use a combination of amines to effect the polymerization and also the simultaneous decomposition of the dicarbonate. However, it should be possible to adapt existing formulations for polyisocyanurate foams and to replace the chlorofluorocarbon blowing agents frequently used with the dicarbonate blowing system described herein.

Phenolic foams are traditionally prepared from resole resins using an acid catalyst to affect the cure. The method of producing such foams is amply described in standard texts such as:

*Plastic Foams*, Vol. 1, C.J. Benning (Wiley Interscience 1969), ch. 5;

Kirk-Othmer, *Encyclopedia of Chemical Technology*, 3rd Ed., Vol. 17, p. 411 (Wiley Interscience 1982);

*Handbook of Foamed Plastics*, R.J. Bender (Lake Publishing, 1965), p. 306; and

*Plastic Foams*, Vol. 1, Part 2, chapter 11 (Marcel Dekker 1973, Ed. K.C. Frisch and J.H. Saunders).

More recently, a system for the rapid curing of phenolic resins at ambient temperatures using isocyanates and tertiary amines has been described by C. Thankachan in *J. Coatings Tech.* Vol. 61 (769), 36–45, (1989) and references therein. Such curing systems should be useful in conjunction with dicarbonate blowing agents to produce phenolic foams. U. S. Pat. No. 3,271,331 also describes the use of tertiary amines as catalysts in the production of phenolic foams when crosslinking agents, notably diisocyanates, are incorporated.

Low temperature cured epoxy-resin foams are frequently cured with primary amines such as triethylenetetramine utilizing the ensuing exotherm to volatilize the physical blowing agent used. Thankachan in the previously cited reference describes the curing of epoxy resins with isocyanates and tertiary amines. The curing time is sufficiently rapid to indicate that such a system would be suitable for the production of epoxy-resin foams when used with dicarbonate blowing agents. U. S. Pat. No. 2,906,717 (3M Company) describes a resin formulation comprising an epoxy resin, an aldehyde resin and a polyisocyanate. Foaming is achieved by the addition of water to react with the excess isocyanate incorporated in the resin mix; curing is with an amine catalyst (including tertiary amines). Such resins should be well suited for use with the dicarbonate blowing agent system described herein.

Dandge and Kops described in *J. Polym. Sci., Polym. Chem. Ed.*, Vol. 18, p. 355 (1980), the formation of a poly(imide-urethane). The rate of formation of the polymer is relatively slow but is greatly enhanced when quinuclidine is used to catalyze the reaction. Quinuclidine is also an excellent catalyst for the decomposition of dicarbonates. By careful selection of the dicarbonate and amine foaming of this novel resin should be possible.

Flexible polyurethane foams have been produced in accordance with the present invention using the decomposition of dicarbonates as a major source of blowing agent. The principal source of blowing agent was typically from the reaction between water and isocyanate to produce carbon dioxide. The decomposition of dicarbonates contributed to softness of the flexible foam as well as to blowing of the foam. For example, the water-isocyanate reaction alone, in a flexible polyurethane foam formulation of the kind discussed subsequently, produces a polyurethane foam having a density of about 2 lb/ft$^3$. Use of the dicarbonate decomposition reaction in combination with the water-isocyanate reaction produces a polyurethane foam having a highly desirable softness and a density of about 1.5 lb/ft$^3$ or below. Dicarbonates investigated as blowing agents included diisobutyl dicarbonate, diisopropyl dicarbonate, diethyl dicarbonate, t-butyl methyl dicarbonate, t-amyl n-butyl dicarbonate, diethylene glycol bis(t-amyl dicarbonic acid ester), and diethylene glycol bis(t-butyl dicarbonic acid ester). Although several of these dicarbonates are symmetrical in functional alkyl groups, this is not a requirement for the composition of the present invention. The use of a t-butyl or t-amyl functional alkyl group does not decrease the temperature at which catalytically assisted decomposition of the dicarbonate begins; however, in applications where the reaction temperature of the polymer/foam mixture exceeds 100° C., it may be possible to benefit from some thermal decomposition of the dicarbonate with an accompanying liberation of two to three moles of gas per mole of dicarbonate.

The use of linking groups between the dicarbonate portions of two or more dicarbonate molecules or fragments enables the production of at least two molecules of carbon dioxide per molecule of the resulting polydicarbonate, as opposed to a single molecule of carbon dioxide per molecule of dicarbonate normally obtained when the linking group is not present. For example, a bis-dicarbonate would yield two moles of carbon dioxide. It can be advantageous to use such polydicarbonates in certain polymer compositions, since they are less volatile than the corresponding dicarbonates, and thus are less likely to be lost due to evaporation before they decompose. Furthermore, the linking groups can be selected to make the dicarbonate molecule more compatible with the polymer (e.g., more soluble therein).

Thus, by tailoring the dialkyl dicarbonate comprised molecule, it is possible to obtain the onset of catalyzed decomposition of the molecule at about room temperature, and to take advantage of the exothermic reaction of the polyurethane formation to achieve at least a limited amount of thermal decomposition when t-butyl, t-amyl or similar t-alkyl substituents are used.

It is important that at least the majority of the dicarbonate be catalytically decomposed prior to reaching the thermal decomposition temperature of the dicarbonate, when the polymer (e.g. polyurethane) gelation-time profile is such that the polyurethane has reached a highly viscous form at the onset of thermal decomposition. A release of a large quantity of gas at this time can crack a relatively rigid foam structure. Thus, the dialkyl dicarbonate molecule and the amount of water employed must be tailored to perform properly with the particular polyurethane (or other polymer) gelation reaction.

The cream time (time between the discharge of the polymeric/foam-producing ingredients from the foam head of a conventional foam manufacturing machine and the beginning of the foam rise) for formulations subsequently discussed typically ranged from about 5 seconds to about 8 seconds at room temperature. At the beginning of the foam rise, the surface of the polymeric/foam-producing liquid will change color, usually becoming lighter, due to evolution of the blowing agent. The rise time (time between the beginning of the foam rise, cream time, and the time at which the foam rise is complete) typically ranged between about 75 seconds and about 100 seconds at room temperature.

The term gel point or gelation as used herein means the reaction of the polymer system has progressed to the extent that the resulting polymer network is infinite within the foam. The term cure time as used herein means the length of time required for sufficient completion of reaction to generate the desired polymer strength and dimensional stability.

The decomposition catalyst used in combination with the dialkyl dicarbonate blowing agent must comprise an amine having particular structural characteristics wherein at least one nitrogen group is readily available for ease of reaction. Tertiary amines having at least one sterically accessible nitrogen which exhibits high nucleophilicity perform well as decomposition catalysts. Such tertiary amines include, for example, molecules having a bridgehead nitrogen, wherein a cyclic structure has a nitrogen at the junction between two fused cyclic ring structures (such as triethylene diamine and quinuclidine); tertiary 4-amino derivatives of pyridine (such as 4-(dimethylamino)pyridine and 4-(4-methyl-1-piperidinyl)pyridine); dimethyl alkylamines (such as bis(2-dimethylaminoethyl)ether, tetramethylethylenediamine, and tetramethylhexamethylenediamine); and polydimethylalkyl amines containing linking groups (such as 1,3,5-tris[3-(dimethylamino)propyl] hexahydro-s-triazine). These particular amines are used because their structural characteristics enable them to catalyze the rapid decomposition of dialkyl dicarbonates at temperatures as low as 10° C. Other amines can enable the decomposition of dialkyl dicarbonates in the range of room temperature; however, the rate of decomposition is considerably slower so the ability of the catalyst/dicarbonate blowing agent combination to adequately perform with a polymer system which gels rapidly is reduced.

The blowing agent system claimed herein exploits the fact that with specific tertiary amine catalysts it is possible to achieve the rapid hydrolysis of dialkyl dicarbonates at ambient temperatures. The liberated carbon dioxide may be used to produce foams from polymerization systems tolerant of amines, water and dicarbonates. However, certain polymerization systems such as those used in the formation of polyurethane foams are catalyzed by tertiary amines. These amines, however, may not be effective decomposition catalysts for dialkyl dicarbonates, in which case a supplementary catalyst must be used to promote the rapid decomposition of the dicarbonate; e.g., N-ethylmorpholine promotes the formation of polyurethanes but would be ineffective as a decomposition catalyst for a dicarbonate blowing agent. In such systems a combination of amines may be required to achieve the desired effect, or it may be possible to replace all, or part, of the polymerization catalyst by the blowing agent catalyst. A similar situation exists in the formation of unsaturated polyesters, where the decomposition of the peroxide initiator may be promoted by a tertiary amine; commonly N,N-dimethylaniline. N,N-dimethylaniline has proven ineffective at promoting a rapid decomposition of dialkyl dicarbonate blowing agents at ambient temperatures, and again, if used would need to be supplemented by a specific blowing agent catalyst in any room temperature foam system.

It is the combination of the dialkyl dicarbonate blowing agent with the catalysts (in the presence of water) capable of providing rapid decomposition (e.g., greater than 100 ml/min./g. at decomposition temperature and atmospheric pressure) over a temperature range of about 10° C. to about 45° C., which provides the foaming system of the present invention. The present invention is illustrated by the following non-limiting examples.

EXAMPLES

The initial examples illustrate the effectiveness of the blowing agents in various polymer systems, some without added $H_2O$. Later examples illustrate the effects of water on the blowing agents, whether added or inherently present in the polymer system.

Symmetrical dialkyl dicarbonates can be prepared for example by contacting an alkyl haloformate and an alkali metal carbonate in the presence of a crown ether and a suitable solvent. This synthesis technique is described in detail in U.S. Pat. No. 4,929,748, assigned to the assignee of the present invention, which is hereby incorporated by reference. For example, diisopropyl dicarbonate was prepared as follows:

A 1 liter, 3-necked flask was equipped with a reflux condenser, dropping funnel, thermometer, mechanical stirrer and calcium chloride drying tubes. The flask was charged with 70 g (0.51 mole) of powdered, anhydrous potassium carbonate; 2 g (0.0076 mole) 18-crown-6 ether and 250 ml of acetonitrile. The reaction mixture was efficiently stirred while 122.5 g (1 mole) of isopropyl chloroformate was added dropwise at such a rate as to maintain a reaction temperature of not more than 40° C. The reaction mixture was stirred for a total of 6 hours and then allowed to stand overnight prior to work up.

The reaction mixture was worked-up by filtering off the inorganic salts and removing the solvent on a rotary evaporator at 30° C. using a water aspirator to provide the vacuum. The resulting liquid was dissolved in 200-300 ml of dichloromethane and washed twice with 100 ml portions of water. After drying over magnesium sulphate, filtering, and stripping of solvent, 80.7 g of a clear liquid was obtained. Analysis by Carbon-13 NMR showed the crude product to consist of almost entirely diisopropyl dicarbonate. Careful vacuum distillation of the crude product gave 77.4 g (0.41 mole) of pure diisopropyl dicarbonate (boiling point 44° C.–48° C. at 0.25 mm Hg; overall yield 82%).

Non-symmetrical or asymmetric dicarbonates were prepared using a standard procedure for synthesizing such mixed anhydrides, which is well known in the art (see French patent application, Publication No. 2,220,564 previously incorporated by reference), and therefore the procedure is not described in detail herein. Table 1, which follows, illustrates some of the dicarbonates made by this route. Products were purified by vacuum distillation where possible; otherwise they were left in a crude state.

TABLE 1

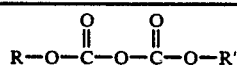

| wherein R and R' are as indicated: | |
|---|---|
| R | R' |
| n-Bu | 2-methoxy ethyl |
| n-Bu | i-Pr |
| n-Bu | n-Bu |
| t-Bu | Me |
| t-Bu | Et |
| t-Bu | i-Pr |
| t-Bu | n-Bu |
| t-Bu | Allyl |
| t-Bu | 2-Ethylhexyl |
| t-Amyl | n-Bu |
| t-Amyl | i-Bu |
| i-Bu | i-Bu |
| 2 × t-Bu | —CH$_2$CH$_2$OCH$_2$CH$_2$— |
| 2 × i-Pr | —CH$_2$CH$_2$OCH$_2$CH$_2$— |
| 2 × t-Amyl | —CH$_2$CH$_2$OCH$_2$CH$_2$— |

EXAMPLE 1

Preliminary screening of dialkyl dicarbonate/catalyst systems for blowing agent activity in room-temperature initiated flexible polyurethane foam production was accomplished using a 1.25 lb/ft$^3$ density foam formulation similar to formulations used to produce furniture. Further evaluation was done using an automotive type formulation. Both formulations are given below in Table 2.

TABLE 2

| FLEXIBLE POLYURETHANE FOAM FORMULATIONS | | |
|---|---|---|
| Component | Furniture Formula Parts by Weight | Automotive Formula Parts by Weight |
| Niax 1656 Polyol | 100.00 | 100.00 |
| Niax L5740 Silicone | 1.10 | 1.40 |
| NEM Amine Catalyst | 0.20 | 0.20 |
| 33 LV Amine Catalyst | 0.30 | 0.30 |
| T-10 50% Stannous Octoate | 0.45 | 0.35 |
| Dialkyl Dicarbonate | 3.50 | 3.00 |
| Water | 4.50 | 3.85 |
| TDI 80/20 | 58.95 | 51.45 |
| Index (TDI) | 112 | 111 |

The Polyol 1656 ® is a polyether polyol available from Union Carbide Corp. The L5740 Silicone ® is an organosilicon available from Union Carbide Corp. which was used to stabilize the foam while the foam was rising. This surfactant affects the final cell structure of the foam. NEM Amine Catalyst ® is an N-ethyl morpholine available from Texaco Chemicals. The NEM catalyst was used primarily to catalyze the isocyanate-water reaction and to produce urea linkages. The 33 LV Amine Catalyst ® is a triethylenediamine (33 wt % solution in dipropylene glycol) available from Air Products Inc. This catalyst was used to decompose the dialkyl dicarbonate blowing agent, catalyze the isocyanate-water reaction, and to create linkages. T-10 50% Stannous Octoate ® is available from Air Products Inc., and was used in the formulation as a catalyst to accelerate the Polyol/TDI (isocyanate) reaction. The dialkyl dicarbonate blowing agent most frequently used was diisobutyl dicarbonate. Water was used in the formulation to react with isocyanate, generating amines and carbon dioxide gas. This amine subsequently reacts with additional isocyanate to yield urea linkages. The carbon dioxide gas generated by the water reaction provides blowing agent action, but was used in combination with the dicarbonate blowing agent to provide the total gaseous components necessary for foam formation. TDI 80/20 ® is a toluene di-isocyanate available from Mobay Chemical Co. which was used to react with the polyol to form urethane and to react with water and amines to form crosslinks with or branches from polyurethane molecules. The TDI index of the TDI 80/20 indicates the stoichiometry of the reaction, e.g., an index of 112 indicates that 12 percent more TDI than the necessary stoichiometric amount was used. The excess TDI contributes to additional crosslinking, and thus firmness of the foam.

Preliminary evaluation, in the form of individual laboratory batch foam production, required development of a method for mixing the formulation so the blowing agent would not decompose too early in the reaction, prior to substantial formation of reacted polyurethane. In the Furniture formulation, the dicarbonate was added with the TDI while the catalyst for decomposition of the dicarbonate was added to the mixture of other ingredients to which the TDI/dicarbonate mixture was subsequently added. In the Automotive Formulation, a polyol/dicarbonate premix was made, the stannous octoate polymerization catalyst was added to these ingredients while they were mixing and the water solution including silicone surfactant, NEM amine catalyst and 33LV amine catalyst were added simultaneously with the TDI at separate addition positions to the polyol/dicarbonate premix.

low). Acceptable foams were obtained with both catalysts.

Preliminary screening of the dicarbonate/catalyst system as a blowing agent for room-temperature initiated polyurethane foam production was accomplished using the rigid foam formulation shown in Table 4.

TABLE 3

Dicarbonates as Blowing Agents for Flexible Urethane Foam
AUTOMOTIVE TYPE FORMULA

| Auxiliary Blowing Agent | Catalyst | Density Pounds Per Cubic Ft. (pcf) | Breathability* Air FLow (cf/min) | Indentation Force Deflection (pounds) | Compression Set Resistance |
|---|---|---|---|---|---|
| No Blowing Agent | — | 1.42 | 4.5 | 32.1 | Excellent |
| Methylene Chloride | — | 1.25 | 6.1 | 23.3 | Excellent |
| Diethyl dicarbonate | triethylene diamine | 1.29 | 4.5 | 19.4 | Poor |
| Diisopropyl dicarbonate | triethylene diamine | 1.25 | 6.3 | 15.9 | Good |
| Diisobutyl dicarbonate | triethylene diamine | 1.26 | 6.5 | 16.9 | Good |
| t-butylmethyl dicarbonate | triethylene diamine | 1.29 | 5.9 | 17.2 | Fair |

*An indication of foam porosity measured by passing air through the foam.

A typical manufacturing line would comprise equipment having a mixing head into which several individual ingredients can be added separately, mixed in the head and deposited immediately upon a surface outside the head. For purposes of manufacturing, it is preferred to use a single highly active amine catalyst such as the 33 LV Amine Catalyst to decompose the dicarbonate blowing agent, catalyze the isocyanate-water reaction and produce crosslinking linkages, simultaneously. However, a dual amine catalyst system can be used to tailor the foaming rate to the polyurethane reaction rate, specifically. In the dual catalyst system it is always necessary to have a highly active amine catalyst, e.g., 33 LV, present, with an optional amount of a lower activity amine catalyst, e.g., NEM.

Methylene chloride, a blowing agent commonly used in the industry, was used in place of the dicarbonate blowing agent in laboratory batch foam preparation using the formulations provided above, for comparative purposes. The methylene chloride was mixed into the polyol and other ingredients were subsequently added to the mixture. Presently urethane foam manufacturers are seeking a replacement for methylene chloride, which is considered to be a health hazard in the working environment.

In the Furniture Formulation, all the dicarbonates evaluated showed a blowing efficiency at least equivalent to methylene chloride. In the Automotive Formulation, the dicarbonates showed similar efficiency to methylene chloride but the foam produced was softer as indicated by indentation force deflection (IFD). Properties of the cured polyurethane foams produced using the automotive type formulations shown in Table 2 are provided in Table 3. In addition to the highly desirable softness characteristic of the foam, the chief advantage of the dicarbonate blowing agents is their desirability based on environmental considerations.

EXAMPLE 2

The catalyzed dialkyl dicarbonate blowing agents have also been successfully used to produce rigid polyurethane foams. Diisobutyl dicarbonate was investigated in a rigid polyurethane foam as described below; again, symmetrical substituent groups on the dicarbonate blowing agent are not required. The catalysts used in combination with the dicarbonate blowing agent were triethylenediamine and Polycat 41(described below).

TABLE 4

RIGID POLYURETHANE FOAM FORMULATIONS

| Component | Standard Formulation Weight Percent | Dialkyl Dicarbonate Formulation Weight Percent |
|---|---|---|
| A Component | | |
| Mondur MR* | 50.2 | 50.2 |
| Blowing Agent F-11B* | 1.5 | |
| Dialkyl Dicarbonate | | 17.0 |
| B Component | | |
| PolyolR 650* | 31.9 | 31.9 |
| Surfactant DC 193* | 0.5 | 0.5 |
| Polycat 41 Amine Catalyst* | 0.7 | 0.7 |
| Tin Catalyst T-45 | 0.7 | 0.7 |
| Blowing Agent F-11B | 14.5 | |

*The Polyol R650 ® is an amine aromatic-based polyol available from ARCO, Texaco Division. The DC 193 Surfactant is a silicone available from Dow Corning Co. Polycat 41 Amine Catalyst is 1,3,5-tris [3-(dimethyl-amino)propyl] hexahydro-s-triazine, available from Air Products Corp. Mondur MR is a polymeric isocyanate available from Mobay Chemical Co. and was used to react with the polyol. Blowing Agent F-11b is a monofluoro-trichloromethane available from Pennwalt Corp. The dialkyl dicarbonate used was diisobutyl dicarbonate.

In the laboratory evaluation component A and component B were mixed separately and then the two components were mixed together. The density of the polyurethane foam produced using the formulations shown in Table 4 was 3 lb/ft$^3$ in each case.

In another evaluation, the amount of F-11B blowing agent in Component B was reduced to 8 parts in the F-11B blowing agent in Component A was replaced with 3 parts of di-isobutyl dicarbonate. The foam produced using this mixture of blowing agents exhibited a density of about 3 lb/ft$^3$. This latter combination of blowing agents permits a reduction in the amount of chlorofluorocarbon blowing agent used while providing a rigid polyurethane foam exhibiting heat transfer characteristics useful for insulation applications. As previously discussed, it is believed halogenated or polyhalogenated substituent alkyl groups on the dicarbonate molecule can be used to provide rigid polyurethane having heat transfer characteristics useful for insulation applications without the use of chlorofluorocarbon blowing agents.

POLYESTER FOAMS

Examples 3 to 6 illustrate the use of the blowing agent catalyst combinations of the invention in the production of both filled and unfilled foams from commercially available unsaturated polyester resins.

The gel time data was obtained using a Sunshine Gel-Time meter. The peak exotherms and cure times were determined by use of a type J thermocouple embedded in the resin sample. The cure time (time to peak exotherm) was determined as the time from when the peroxide was added to the resin until it reached its peak temperature.

EXAMPLE 3

Unfilled polyester foams were produced using Owens-Corning Fiberglas (OCF) 701 resin promoted with 0.6 wt. percent of a 1 percent solution of cobalt octoate. The formulation contained: Resin, 25 g; dimethylaniline (DMA), 0.064 g; triethylenediamine (Dabco), 0.038 g; Cadox M50, 0.40 g; diisobutyl dicarbonate, 1.0 g. The formulations were mixed, and the foams produced, in small (50 ml) polypropylene cups. Typical gel times were 8-9 min, cure times 25-30 min and peak exotherm temperature of 130° C. Expansions were 50-100 percent based on foam height but the foams frequently exhibited splitting or cracks.

EXAMPLE 4

Filled polyester foams were produced using OCF 701 resin promoted with 1 wt. percent of a 1 percent solution of cobalt octoate. The formulation contained: Resin, 25 g; calcium carbonate, 10 g; dimethylaniline (DMA), 0.063 g; triethylenediamine (Dabco), 0.042 g; Cadox M50, 0.32 g; diisobutyl dicarbonate, 1.0 g. This produced a gel time of 13 minutes, a cure time of 30 minutes and a peak exotherm of 95° C. While the foams produced were satisfactory, filler loadings in excess of 25 wt. percent (total formulation weight) inhibited the full curing of the foam.

EXAMPLE 5

Filled polyester foams with uniform cell structure and exhibiting no splits or cracks were produced using Koppers 1060-5 resin. Koppers 1060-5 is an orthophthalic resin promoted with 229 ppm of cobalt. The formulation contained: Resin, 25 g; calcium carbonate, 25 g; DMA, 0.1 g; Dabco, 0.16 g; Cadox M50, 0.40 g; and diisobutyl dicarbonate, 0.50 g. This gave a gel time of 7.5 minutes, a cure time of 21 minutes and a peak temperature of 72° C.; expansion was typically 150 percent.

The exclusion of DMA resulted in lengthening the gel time by 30 to 50 percent but did not prevent foaming or complete curing; cell size was slightly larger when DMA was excluded.

EXAMPLE 6

Filled polyester foams were produced from Koppers 1060-5 resin using a number of fillers. The foaming performance was found to be related to the viscosity of the formulation and also the particle size of the filler; e.g. with calcium carbonate or aluminum trihydrate a good foam was obtained when the viscosity of the system (less initiator and Dabco) was greater than 1500 centipoise. This was achieved at filler loadings of 45 to 50 wt. percent with a particle size greater than 3 microns diameter. Fillers with average particle sizes less than 3 microns appeared to inhibit cure.

In unfilled systems it was found beneficial to adjust the viscosity of the resin by the addition of 1-2 wt. percent of fumed silica; this also acted as a source of nucleation centers for the evolved gas.

EXAMPLE 7

Examples 7 to 11 illustrate the effectiveness of the blowing agent-catalyst combinations of the invention in the production of thin section foams. Such foams are typically difficult to cure due to the relatively large specific surface areas, since distributing sufficient heat throughout the volume of the material to cure the resin is impaired by the exposed surface area.

| | |
|---|---|
| Koppers 1060-5 resin | 25 g |
| Dabco[2] triethylenediamine | 0.160 g |
| Dimethylaniline | 0.011 g |
| Cadox M50[3] initiator | 0.458 g |
| Diisobutyl dicarbonate | 0.502 g |
| DC193[1] surfactant | 0.259 g |
| Camel White CaCO$_3$ | 25 g |

[1]DC 193 is a surfactant manufactured by Dow Corning.
[2]Dabco is a trade name of Air Products, in this case it refers to triethylenediamine.
[3]Cadox M50 is a methyl ethyl ketone peroxide initiator manufactured by Akzo Chemicals Inc.

The components were mixed such that the peroxide and blowing agent were added last. The resulting formulation was poured into a mold to depth of 3/16". The foam gelled after 6.5 minutes and cured within 16 minutes with a peak exotherm of 71° C. An expansion from 3/16" to 5/16" was observed.

EXAMPLE 8

A thin section unfilled polyester foam was made using OCF resin #CX 2176 using the following formulation:

| | |
|---|---|
| CX2176[1] | 25 g |
| Interstab NL49P[2] | 0.50 g |
| Dabco | 0.16 g |
| Cadox M50 | 0.26 g |
| Fumed silica | 0.30 g |
| DC 193 surfactant | 0.25 g |
| Diisobutyl dicarbonate | 0.51 g |

[1]CX2176 is a Dicyclopentadiene-based resin of Owens Corning Fiberglas.
[2]Interstab NL49P is commercial cobalt accelerator (supplied by Akzo Chemicals Inc.)

The components were mixed as before and poured into a 3 mm deep mold. Gel time was 2 minutes and cure time was approximately 4.5 minutes with a peak exotherm of 57° C. The expansion was approximately 100 percent.

EXAMPLE 9

A thin section unfilled polyester foam was made using OCF resin CX1704 in the following formulation:

| | |
|---|---|
| OCF CX1704 resin[1] | 25 g |
| Interstab NL49P | 0.26 g |
| Dabco | 0.16 g |
| Cadox M50 | 0.33 g |
| Fumed silica | 0.30 g |
| DC 193 surfactant | 0.25 g |
| Diisobutyl dicarbonate | 0.49 g |

[1]OCF 1704 is a general purpose orthophthalic resin manufactured by Owens Corning Fiberglas.

The reaction mixture was poured into a 3 mm mold and allowed to expand. The gel time was approximately 8.5 minutes, cure time 13.5 minutes and peak temperature 66° C. Expansion was approximately 100 percent.

EXAMPLE 10

Effect of filler particle size in foam formulations: Example 10 illustrates the effect of filler particle size on cure and gel times when foaming filled systems.

Portions of filled polyester foams were prepared using the formulation below and fillers ($CaCO_3$ or aluminum trihydrate) of varying average particle size.

| Formulation: | |
|---|---|
| Koppers 1060-5 | 25 g |
| Dabco | 0.16 g |
| DMA | 0.01 g |
| Cadox M50 | 0.40 g |
| Diisobutyl dicarbonate | 0.50 g |
| Filler | 25 g |

| | Foam Preparation Results | | | |
|---|---|---|---|---|
| Filler | Particle Size Av. diam., microns | Gel Time min. | Cure Time min. | Peak T °C. |
| $CaCO_3$ | 16 | 5.5 | 9.5 | 92 |
| | 3 | 6.2 | 15.6 | 88 |
| | 1 | 25 | — | <30 |
| ATH | 20 | 8.5 | 18.1 | 69 |
| | 9 | 10.5 | 30 | 39 |
| | 2 | — | — | — |

ATH = Aluminum Trihydrate

Clearly the particle size of the filler used affects the ability of the resin formulation to gel and cure, with both gel and cure times varying inversely with particle size. This in turn will have an effect on the foam forming performance of the formulation.

EXAMPLE 11

Example 11 illustrates the effects of filler loading upon the mixture viscosity, and consequently upon the foaming performance of filled resins.

Koppers 1060-5 resin was mixed with various loadings of Camel White calcium carbonate and the viscosity of each mixture was measured using a Brookfield LVT viscometer with a #3 spindle @ 60 rpm. The results are indicated below.

| Resin/g | $CaCO_3$/g | $CaCO_3$ % wt. | Init. visc./cps 5 rotations | Finalvisc./cps after 1 min. |
|---|---|---|---|---|
| 250 | 50 | 16.7 | 456 | 456 |
| 250 | 100 | 28.6 | 740 | 632 |
| 250 | 150 | 37.5 | 1356 | 950 |
| 250 | 200 | 44.4 | 1970 | 1456 |
| 250 | 250 | 50.0 | 3400 | 3080 |

Using a formulation similar to that described in the previous example, the minimum level at which an acceptable performance was seen was at 37.5 percent filler loading.

HYPOTHETICAL EXAMPLES A TO D ADDITIONAL POLYMER FOAMS

EXAMPLE A

A rigid polyisocyanurate foam is prepared by adapting a formulation discussed in *Plastic Foams,* Frisch and Saunders, Vol. 1, Part. 2, Ch. 14 (p. 739) (Marcel Dekker, 1973). The resulting foam recipe, shown in the table below, involves the augmentation or replacement of at least a portion of the halocarbon with diisobutyl dicarbonate or another suitable blowing agent in Component A. In Component B, the triazine polymerization catalyst is augmented as necessary with triethylenediamine to catalyze the blowing agent as well.

| Typical Formulation for the Preparation of a Rigid Isocyanurate Foam[1] | |
|---|---|
| Composition | Parts by weight |
| Component A: | |
| Fomrez R-420 (32.4% NCO[4]) | 100.0 |
| Trichlorofluoromethane and/or Diisobutyl dicarbonate | 8.0 |
| Silicone surfactant (alkyl siloxane-polyoxyalkylene copolymer)[2] | 1.0 |
| Component B: | |
| N,N'N"-Tris(dimethylaminopropyl) sym-hexahydrotriazine | 0.8 |
| Diglycidyl ether of bisphenol A[3] | 0.8 |

[1] Data from Nicholes & Gmitter, J. Cell. Plastics 1,85 (1965).
[2] Silicone L-520, Silicones Division, Union Carbide Corp.
[3] DER-332, Dow Chemical Co. Cocatalysts for Polymerization.
[4] Trademark of Witco Chemical for series of polyester and polther resins.

The resulting discharge of carbon dioxide is sufficient to foam the crosslinking polymer, which is cured by the exothermic formulation of isocyanurates.

EXAMPLES B AND C

These examples of foams produced from resins including combinations of melamine-formaldehyde or phenol formaldehyde resins with epoxy resins are adapted from Examples 2 and 3 of U.S. Pat. No. 2,906,717 by incorporating in the foam formulations suitable quantities of diisobutyl dicarbonate (or other suitable dialkyl dicarbonate) and a suitable tertiary amine catalyst such as triethylenediamine. The blowing agent of the invention thus augments, or may replace, the water/N-methyl morpholine blowing agent used in the patent examples.

As described in the patent, the improved cellular plastics of the present invention are produced by the reaction between an organic polyisocyanate and a combination or mixture of an epoxy resin and an aldehyde resin and the inclusion of an isocyanate foaming agent such as water, organic acids and anhydrides, and simple alcohols and ketones, and an amine catalyst. Water and amine catalysts are described as the preferred foaming agents. If one of the isocyanate foaming agents is not present, insufficient carbon dioxide is produced to form a low density product.

As a catalyst for the production of the foams, any amine or mixture of amine can be used. Primary, secondary and tertiary amines are included among those which can be employed as catalysts. The following are listed as illustrative: ethylenediamine, triethylamine, diethylenetriamine, piperidine, N-methyl morpholine, and 3-diethylaminopropylamine.

EXAMPLE B 10 parts by weight of a melamine-formaldehyde resin marketed by Rohm & Haas under the trade name Uformite QR 336, is dissolved in 10 parts by weight of an epoxy resin product of Bisphenol A and epichlorohydrin having an epoxide equivalent of about 150–210 and a molecular weight of about 350 marketed by Shell Chemical Corporation under the trade name Epon 828 with heat. To this is added with high speed agitation 10 parts by weight of Aerosol TO,, a dioctyl sodium sulfosuccinate emulsifier marketed by American Cyanamid Co. The foregoing mixture produced by the agitation is foamed by the addition of 0.3 part of water and 0.2 part of N-methyl morpholine, augmented by about 1 part diisobutyl dicarbonate and an effective amount of triethylenediamine as catalysts. The resulting rigid cellular plastic product has a density of about 3.7 pounds per cubic foot or less.

EXAMPLE C 5 parts by weight of a phenol-formaldehyde resin, marketed by the Bakelite Company under the trade name Bakelite BR No. 254, is melted in 15 parts by weight of an epoxy resin marketed by Houghton Laboratories under the trade name Hysol 6020. To this mixture is added with high speed agitation, 8 parts by weight of 2.4-tolylene diisocyanate and 0.1 part of the emulsifier employed in Example B until an even creamy textured mixture results. This mixture is foamed by the addition of 0.25 part by weight of water and 0.15 part of N-methyl morpholine, augmented by about 1 part diisobutyl dicarbonate and an effective amount of triethylenediamine as catalysts. The resulting rigid cellular product has a density of about 5 pounds per cubic foot or less.

EXAMPLE D

Foam samples are prepared from a novel polymer disclosed in U.S. Pat. No. 3,836,491. The polymer is formed by crosslinking an hydroxybenzoic acid- (i.e., one in which the benzyl group benzene ring includes at least one hydroxy group, with or without additional substituents) capped prepolymer with a polyisocyanate in the presence of a tertiary amine. While the patent does not disclose the use of such polymers in foams, the gel time of 2 to 3 minutes and use of tertiary amine polymerization catalysts (which can also catalyze the blowing agents of the present invention) identify them as suitable polymers for foaming with these blowing agents.

First, a low molecular weight phenolic functional polyester is prepared from the ingredients listed below.

| Component | Wt. percent |
|---|---|
| Adipic acid (AA) | 13.08 |
| Trimethylol propane (TMP) | 24.00 |
| | 37.08 |
| — Water of estification | 3.22 |
| | 33.86 |
| Methyl salicylate (MS) | 108.85 |
| Dibutyltin oxide (DBTO) | .72 |
| | 143.43 |
| — Methanol from transesterification | 11.48 |
| | 131.95 |
| — Excess methyl salicylate | 46.95 |
| | 85.00 |
| Cellosolve acetate (CA) urethane grade | 15.00 |
| | 100.00 |

The AA and TMP are charged into a reactor equipped with an agitator, the thermometer, water trap, and condenser. The charge is slowly heated to a stirrable slurry under a nitrogen blanket. Heating is then continued to 335° F.–340° F. where the water of esterification begins distilling. Continuing heating to 480° F. esterification is continued to an acid value of less than 5. The reactor is cooled to 350° F. and the MS and DBTO are added. After inserting a fractionating column into the apparatus, the reactor is reheated to 365° F. where the methanol from transesterification begins distilling. Heating is continued to about 500° F. to complete the transesterification reaction. The reactor is cooled to 125° F., the water trap and fractionating column are removed, and the apparatus is set up for vacuum distillation. The system is evacuated to about 0.05 mm Hg gauge pressure and the reactor is reheated to 155° F. to 160° F. where the excess methyl salicylate begins distilling. Stripping is continued to a maximum temperature of 385° F. At this point 87 percent of the theoretical unreacted methyl salicylate has been removed. The reactor is cooled to about 300° F. and reduced to 85 percent nonvolatile with the CA. The product is used as the hydroxybenzoic acid capped hydroxy-containing polymer component in a capped polymer-polyisocynate coating system as indicated below.

A hydroxybenzoic acid capped hydroxy-containing polymer-polyisocyanate blend having a non-volatile content of about 70 percent is prepared by mixing at room temperature 43.6 grams of the product above and 56.4 grams of Mondur HC polyisocyanate. The polyisocyanate component is a light stable polyisocyanate solution of the following characteristics:

| | |
|---|---|
| Appearance | Clear liquid. |
| Solids Content | 58.5–61.5%. |
| Available NCO | 11.0–11.6% |
| Color | Gardner 2, Max. |
| Wt. per gallon | 9.3 lb., 77° F. |
| Viscosity | 750–1000 cps., 68° F. |
| Solvent | Cellosolve Acetate: Xylene(25:15) |
| Flash point: | |
| (Open Cup) | 110° F. |
| (Closed Cup) | 87° F. |
| Avg. Equivalent Wt. | 371. |

Considering only the phenolic hydroxyls of the hydroxybenzoic acid capped polymer, the theoretical hydroxy to isocyanate ratio of this blend is one to one. If the phenolic hydroxyls of the unreacted methyl salicylate are included, this ratio will be significantly higher. The viscosity of this blend is about 10 stokes. In air, the viscosity doubles in about 3 hours. However, in a nitrogen atmosphere, viscosity stability is at least 24 hours.

Using procedures similar to those in the preceding examples above, approximately 10 parts diisobutyl (or diisopropyl) dicarbonates per 100 parts are mixed into the polymer blend above. A sufficient quantity of triethylene-diamine or other suitable tertiary amine (i.e., about 0.5 parts per 10 parts dicarbonate) is added to both cure the polymer blend and produce a foam. The resulting foam is formed in an open mold, trough or the like.

The hypothetical examples above illustrate that a wide variety of polymers which polymerize beginning at ambient temperatures and have suitable physical and chemical properties can be selected for foaming by the blowing agent-catalyst compositions of the present invention.

EXAMPLES 12–18

HYDROLYSIS OF DICARBONATES

Comparative gas evolution experiments were conducted using an apparatus comprised of a 100 ml 3-necked flask equipped with a mechanical stirrer and a gas outlet. The gas was collected by displacement of mineral oil using an inverted burette and trough system.

The system gives only comparative data and not absolute figures. The reactions were conducted at ambient temperature.

The experimental procedure adopted was to charge the flask with the reagents, less catalyst, and thoroughly mix. The stirrer was stopped and the catalyst injected; the stirrer and timer were then started.

EXAMPLE 12

Following the previously described procedure; 1.0 g of diisobutyl dicarbonate, 1.0 g of water and 30 g of Niax 1656 polyol were added to the reactor. The reaction was then catalyzed by the addition of 0.05 ml of Dabco 33LV amine catalyst. Gas evolution had completely stopped after 10 minutes and 147 ml of gas had been collected. The reaction was then repeated in the absence of water; this time only 73 ml of gas were collected and again the reaction was completed after 10 minutes.

A similar set of experiments using diisopropyl dicarbonate gave 172 ml of gas after 10 minutes in the presence of water, whereas in the absence of water only 64 ml were obtained after 30 minutes. The results shown in graph form, FIG. 1 clearly illustrate the greater reaction rates and gas yields obtained in the presence of water.

EXAMPLE 13

Figure 2:
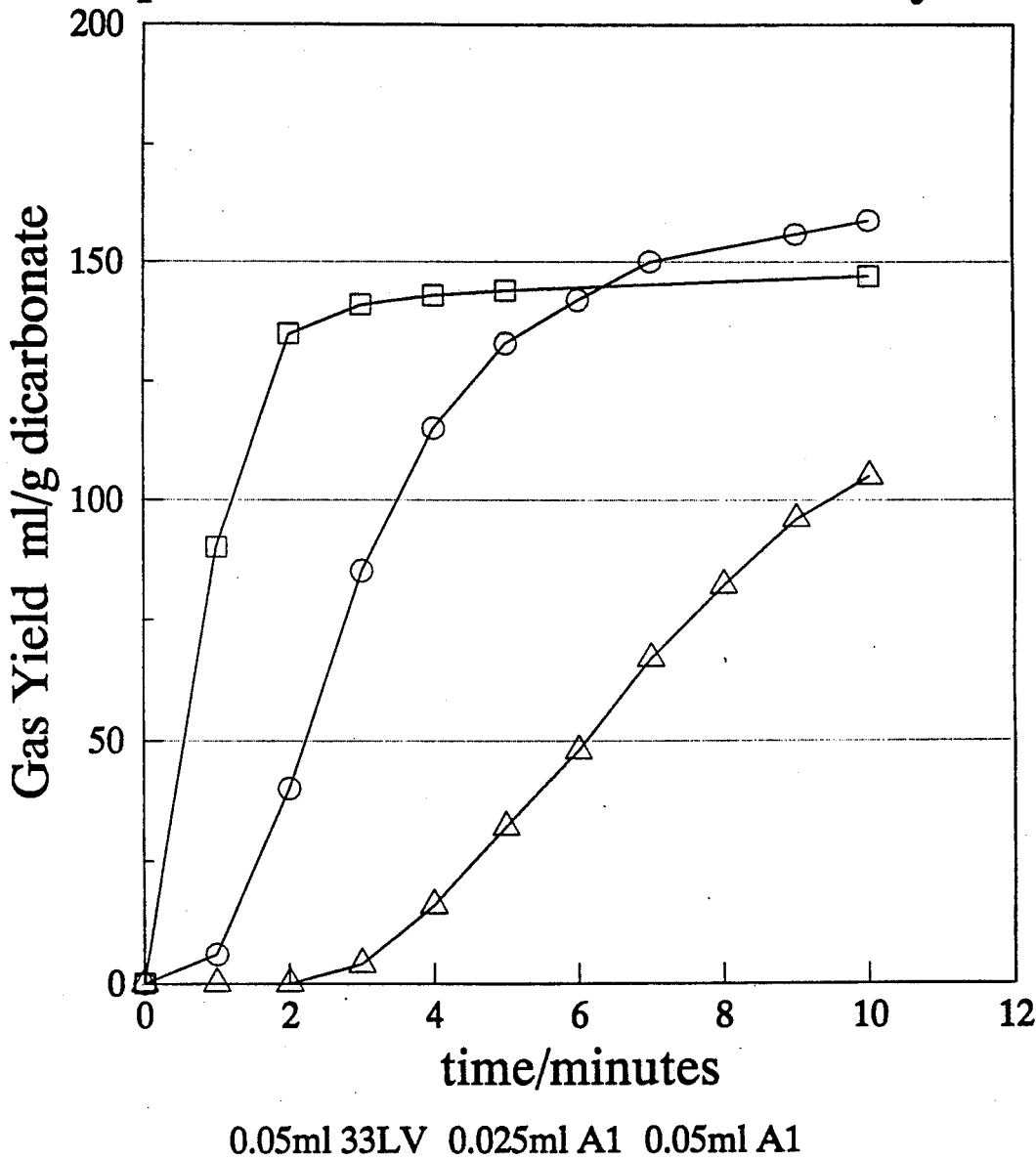
FIG. 2 illustrates the effects of different amine catalysts on the decomposition of diisobutyl dicarbonate in the presence of dipropylene glycol and water.

To illustrate the effect of different amine catalysts on the decomposition of the dicarbonates, diisobutyl dicarbonate was decomposed using Niax A1 catalyst and Dabco 33LV catalyst following the procedure of Example A. Niax A1 is a mixture of 70 wt % bis(dimethylamino)ethyl ether and 30 wt % dipropylene glycol. The catalysts were compared on a volume to volume basis, and since A1 is a 70 percent concentrate and 33LV a 33 percent concentrate, ratios of 1:1 and 1:2 A1:33LV were chosen. In the absence of water no gas had been evolved after 10 minutes at the higher A1 catalyst level; with water 159 ml were collected within 10 minutes, and a total of 162 ml was collected in all. At the lower A1 catalyst level, 0.025 ml A1, only 105 ml had been collected after 10 minutes and 154 ml after 20 minutes. The results are illustrated in FIG. 2.

These results show A1 to be a less reactive catalyst than 33LV but more selective in that, in the system used, any reaction of the dicarbonate not involving water is much slower with A1 than 33LV.

Replacement of A1 or 33LV by N-ethyl morpholine resulted in no visible signs of reaction after 30 minutes in the presence of water.

EXAMPLE 14

Figure 3:
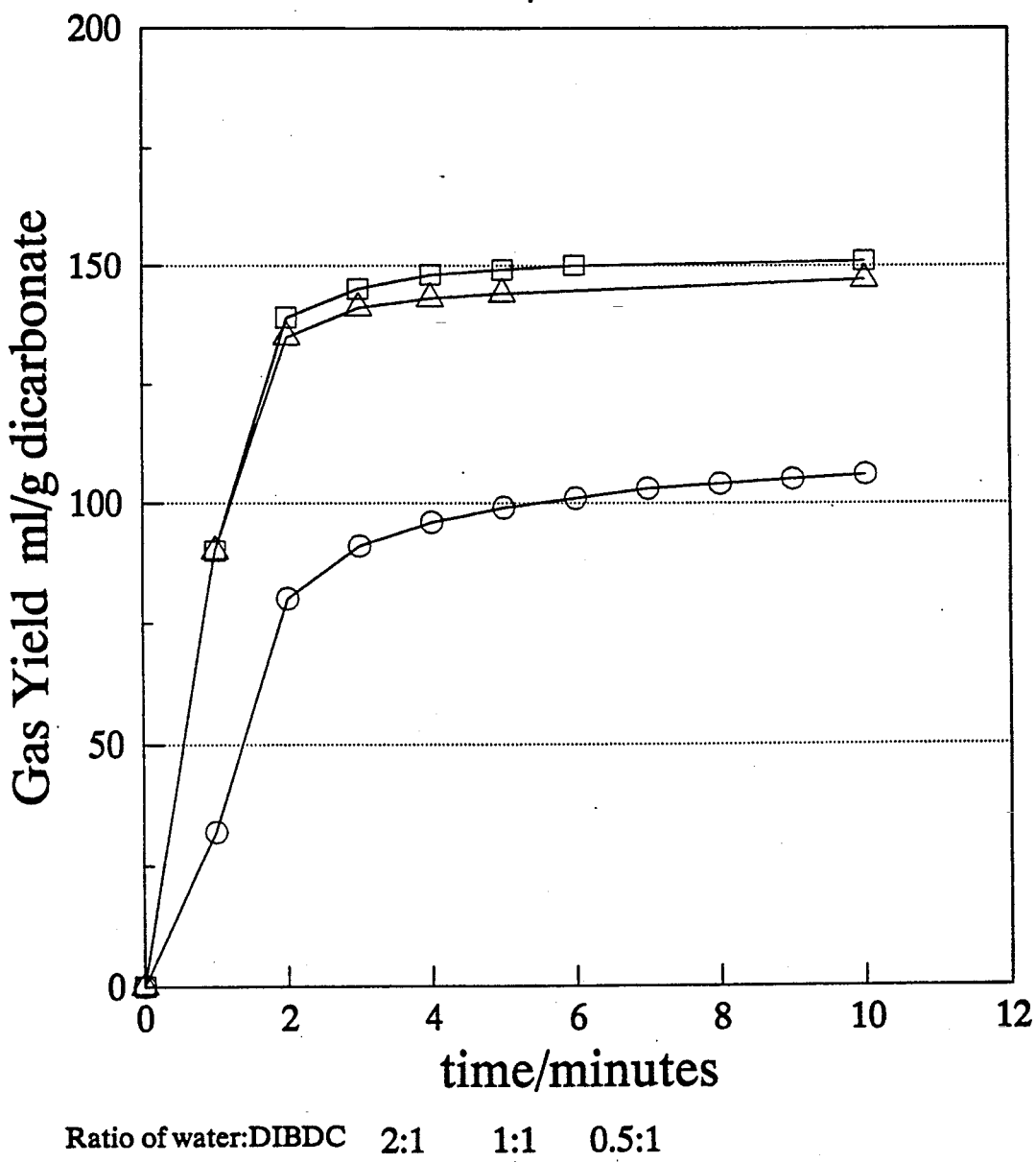
FIGS. 3 and 4 illustrate the effect of the concentration of water on the decomposition of diisobutyl dicarbonate in the presence of a polyol and an amine catalyst.

To illustrate the effect the concentration of water in the system has on the reaction, 1 g of diisobutyl dicarbonate was reacted with 0.5, 1.0 and 2.0 g of water in 30 g Niax 1656 polyol using the previously described procedure; 0.05 ml of Dabco 33LV was used as catalyst. FIG. 3 clearly shows that there was very little difference in reactivity at the 1 g and 2 g levels, but when only 0.5 g of water was used both the reaction rate and gas yield were reduced.

EXAMPLE 15

Figure 4:
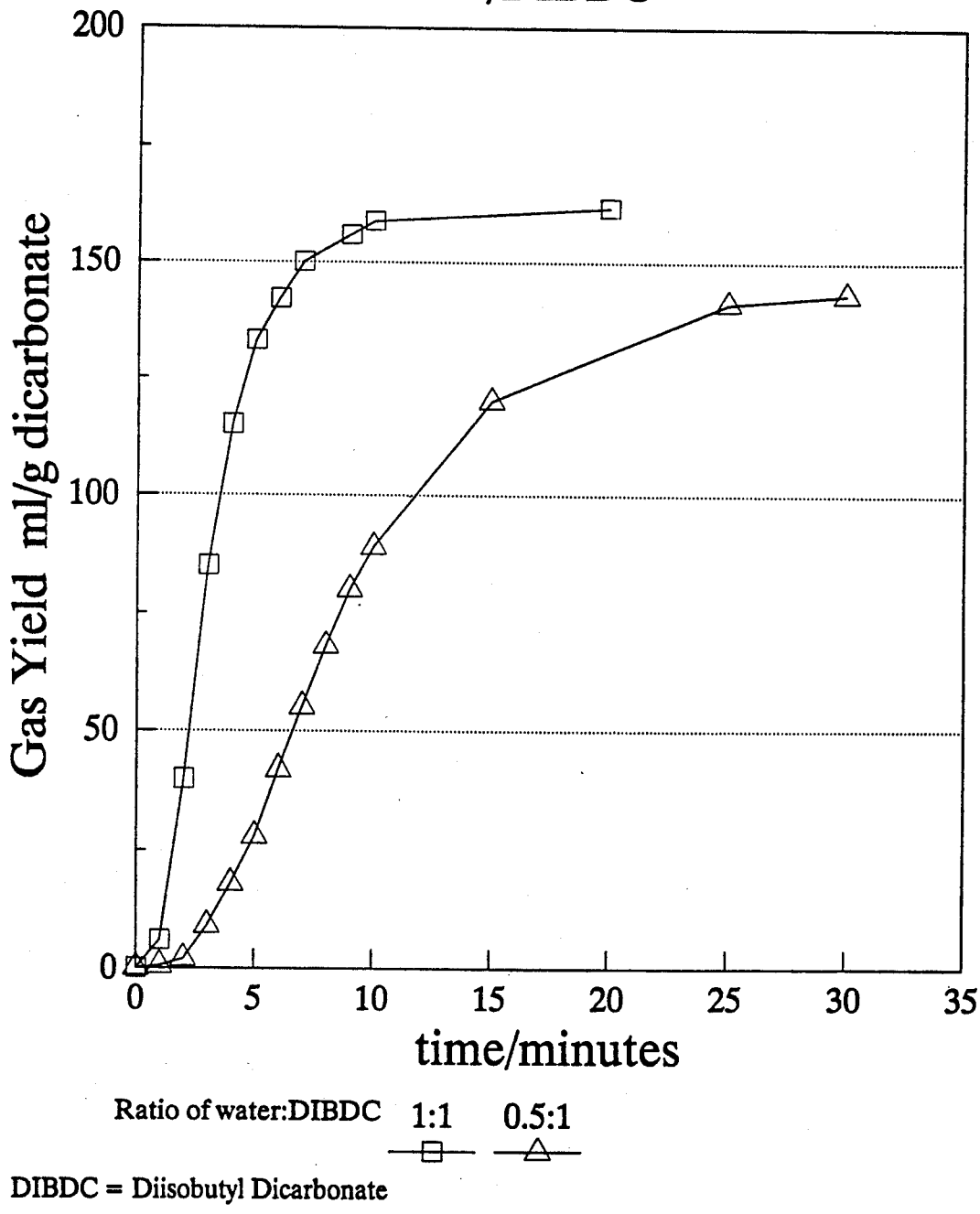

In a trial similar to Example 14, the Dabco 33LV was replaced by Niax A1. Comparison of the results obtained for a 1:1 and 1:0.5 dicarbonate:water ratio, using the A1 at the 0.05 ml level, showed the rate to be slower with the lower water value but the gas yield was less affected than with the 33LV, thus illustrating the selectivity obtained with the A1 catalyst. The results are shown in FIG. 4.

EXAMPLE 16

Figure 5:
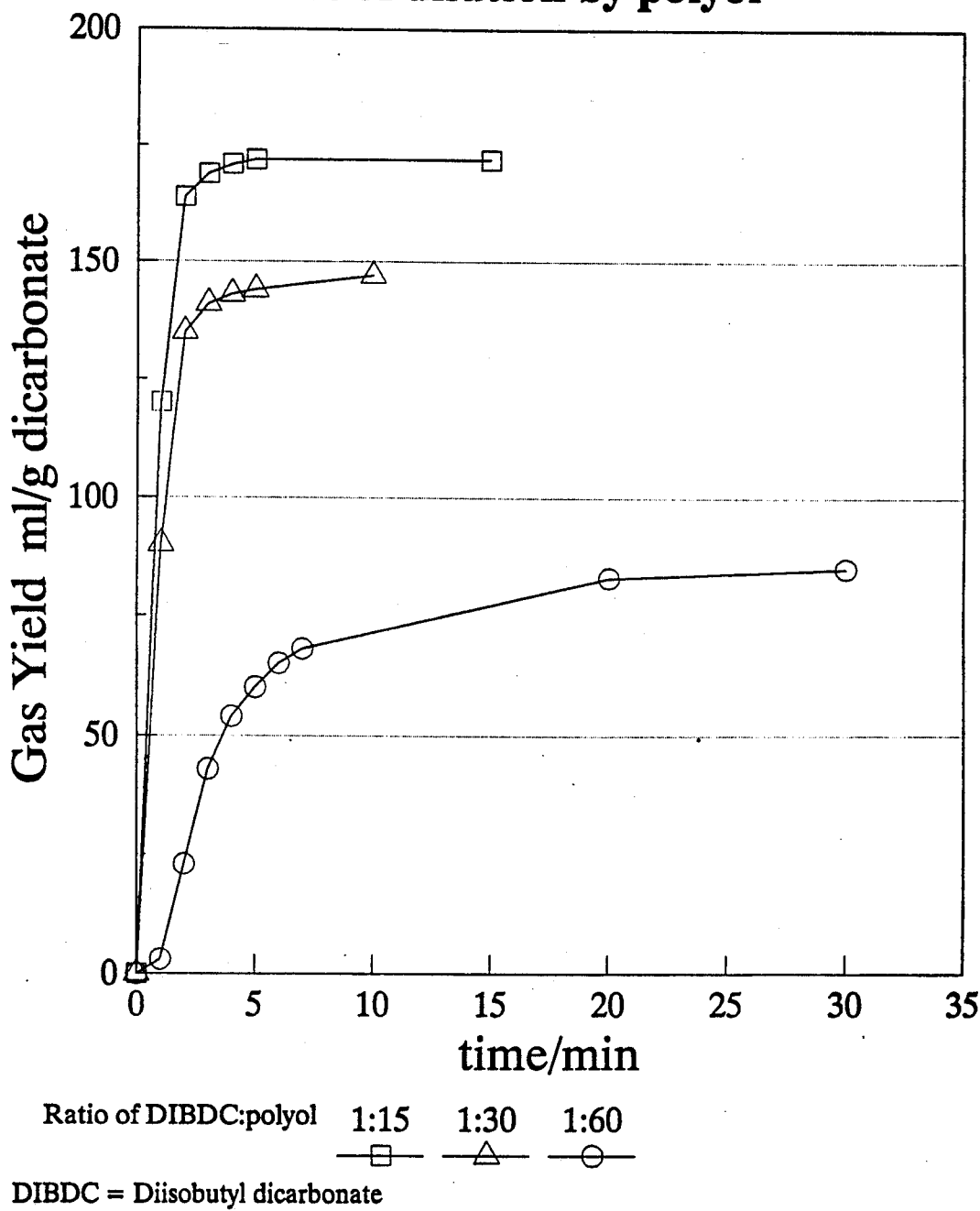
FIG. 5 illustrates the effect of the concentration of polyol on the decomposition of diisobutyl dicarbonate in the presence of an amine catalyst and water.

Following the procedure of Example 12; the effect of polyol concentration on the reaction of diisobutyl dicarbonate in the presence of water was studied. A comparison was made of the reaction of 1.0 g of diisobutyl dicarbonate with 1.0 g of water and 0.05 ml Dabco 33LV in 15, 30 and 60 ml of Niax 1656 polyol. While there was a fall off in both reaction rate and gas yield at the 1:15 and 1:30 dilutions the fall off is most noticeable in going from the 1:30 to 1:60 dilution. The reduction in reaction rate can be explained on a kinetic basis whereas the difference in gas yield is related to the solubility of carbon dioxide in the polyol. The results are shown in FIG. 5.

EXAMPLE 17

Following the general procedure previously outlined, 1.0 g of diethylene glycol bis(isopropyl dicarbonic acid ester) was reacted with 1.0 of water in 30 ml of polyol. A total gas yield of 179 ml/g was recorded. This is in agreement with what might be predicted based on the yields observed with diisobutyl and diisopropyl dicarbonates under similar conditions.

EXAMPLE 18

In a series of reactions to study "solvent" effects, diisobutyl dicarbonate, water and various "solvents" were combined in a 1:1.3:30 ratio and 0.1 ml of Dabco 33LV used to catalyze the reaction. The following results illustrate the effect:

| Solvent | Gas collected/mlP | Reaction time/minute |
| --- | --- | --- |
| Niax 1656 | 137 | 5 |
| DOP | 85 | 20 |
| Mineral oil | 5 | 15 |
| THF | 82 | 7 |
| Isopropanol (IPA) | 114 | 7 |

The results indicate that when using water to enhance the gas yield of the dicarbonate blowing agent a solvent system that exhibits some hydrophilicity is desirable. For example, while the polyol Niax 1656 is not completely miscible with water it is hydrophilic, and this is clearly a contributing factor in the rapid decomposition of the dicarbonate in this solvent; hydrophobic solvents such as mineral oil produce low reactivity. Thus, it is reasonable to expect that any polymerization system utilizing polyols similar to Niax 1656, e.g. polyurethanes, would be suited to the practice of this invention.

The observed differences in gas yields between the uses of polyol, THF and IPA may be due in part to the difference in solubility of $CO_2$ in each solvent. Where the solvent is hydrophobic it is possible that the reaction could be promoted by the use of surfactants and phase transfer agents.

EXAMPLES 19 AND 20

In a polymerization system where a tertiary amine is already present, it may be insufficient to rely on that component to also effect the hydrolysis of the dicarbonate blowing agent. For example, in the polymerization of an unsaturated polyester resin, N,N-dimethylaniline is commonly used to promote the room temperature decomposition of ketone peroxide initiators; however, this amine alone, in catalytic amounts, would be insufficient to promote a timely decomposition of the blowing agent, as evidenced by the following example:

Diisobutyl dicarbonate (1.0 g), water (1.0 g) and Niax 1656 polyol (30 g) were combined in a reaction flask attached to the previously described gas collection system. Amine catalysts were added as 33 weight % solutions in Niax 1656 polyol and the gas evolution monitored. The results are tabulated below:

| Amine | Amount/ml | Reaction time/minutes | Gas Collected/ml |
|---|---|---|---|
| None | — | 30 | 0 |
| DMA | 0.05 | 10 | 0 |
| DMA | 0.10 | 10 | 0 |
| NEM | 0.05 | 30 | 0 |
| 33LV | 0.05 | 5 | 144 |

DMA = N,N-dimethylaniline
NEM '2 N-ethylmorpholine

For further illustration diisobutyl dicarbonate was replaced with diethyl dicarbonate; with no amine present only 3 ml of gas was liberated during ten minutes of agitation, and the addition of 0.05 ml of DMA solution after this time made negligible difference to the rate of gas evolution. However, when 0.05 ml of 33LV was subsequently added to the mixture approximately 200 ml of gas was liberated within the following two minutes and a total of 209 ml after four minutes.

HYPOTHETICAL EXAMPLE E AND COMPARATIVE EXAMPLE F

A thin section filled unsaturated polyester foam is produced using the following formulation (E):

| | |
|---|---|
| Koppers 1060-5 resin | 25 g |
| Water | 0.50 g |
| Dabco (amine catalyst) | 0.160 g |
| Diemthylaniline | 0.011 g |
| Cadox M50 | 0.458 g |
| Diisobutyl dicarbonate | 0.502 g |
| DC193 surfactant | 0.259 g |
| Camel White CaCO$_3$ | 25 g |

DC 193 is a surfactant manufactured by Dow Corning.
Dabco is a trade name of Air Products, in this case it refers to triethylenediamine.
Cadox M50 is a methyl ethylketone peroxide initiator manufactured by Akzo Chemicals Inc.

The components are mixed such that the peroxide and blowing agent are added last. The resulting formulation is poured into a mold to a depth of 3/16″. The resulting foam gels after 6–8 minutes and cures after approximately 20 minutes with a peak exotherm of 70° C.–80° C. An expansion of 100 percent is observed.

The reaction is repeated in the absence of the Dabco catalyst (F) and negligible foaming is observed.

Only a limited number of preferred embodiments of the invention have been described above. However, one skilled in the art will recognize that numerous substitutions, modifications and alterations are permissible without departing from the spirit and scope of the invention as limited by the following claims.

What is claimed is:

1. An improved method of producing polymeric foams wherein at least one of the blowing agents used is a catalyzed blowing agent capable of generating carbon dioxide gas at about room temperature, said method comprising the steps of:

(a) providing a crosslinking polymer system which can be changed from a fluid to a foamed form and incorporating at least one blowing agent comprising a dicarbonate having alkyl substituent end groups;

(b) combining said dicarbonate compound with at least one dicarbonate decomposition catalyst comprising a tertiary amine having at least one sterically accessible nitrogen which exhibits nucleophilicity; and (c) using the combination of said blowing agent and said decomposition catalyst to initiate the generation of carbon dioxide gas at about room temperature to produce said foam, wherein (d) sufficient water is present in or added to said polymer system to increase and/or accelerate the generation of said carbon dioxide gas.

2. The method of claim 1 wherein sufficient water is present to catalyze the generation of more than one mole of carbon dioxide per mole of said dicarbonate compound.

3. The method of claim 2 wherein sufficient water is present to catalyze the generation of up to two moles of carbon dioxide per mole of said dicarbonate compound.

4. The method of claim 1 wherein said combination of said blowing agent with said decomposition catalyst is tailored to the reaction rate of the polymeric reactants used to generate the polymeric portion of said foam, whereby the gelation of said polymeric portion of said foam and the generation of said carbon dioxide gas by said dicarbonate produces a polymeric foam having designated characteristics.

5. The method of claim 4 wherein said crosslinking polymer system can be changed from a fluid to a foamed form in a time period ranging from about 25 seconds to about 10 minutes.

6. The method of claim 4 wherein at least the majority of said dicarbonate compound is catalytically decomposed before reaching its thermal decomposition temperature.

7. The method of claim 1 wherein said decomposition catalyst is selected from the group consisting of molecules having a bridgehead nitrogen, tertiary 4-amino derivatives of pyridine, dimethyl alkylamines, poly(-dimethyl alkylamines) containing a linking group, and combinations thereof.

8. The method of claim 1 wherein said blowing agent includes linking groups between the dicarbonate portions of at least two dicarbonate molecules to form polydicarbonates containing at least two dicarbonate groups.

9. The method of claim 8 wherein sufficient water is present to catalyze the generation of an amount of carbon dioxide ranging from more than one mole up to two moles of carbon dioxide per dicarbonate group per mole of said compound.

10. The method of claim 1 wherein said alkyl substituent contains from 1 to about 10 carbon atoms.

11. The method of claim 10 wherein said alkyl substituent is halogenated or polyhalogenated.

12. The method of claim 10 wherein at least one of said alkyl substituent groups is a tertiary alkyl group.

13. The method of claim 12 wherein linking groups are present between the dicarbonate portions of at least two dicarbonate fragments to form polydicarbonates.

14. The method of claim 1 wherein said polymeric system comprises at least one filler.

15. The method of claim 1 wherein said polymeric foam is a polyurethane foam produced according to a flexible formulation.

16. The method of claim 1 wherein said polymeric foam is a polyurethane foam produced according to a rigid formulation.

17. The method of claim 1 wherein at least one additional physical or chemical blowing agent is used in combination with said dicarbonate blowing agent.

18. The method of claim 17 wherein said additional blowing agent is a physical blowing agent comprising a chlorofluorocarbon.

19. The method of claim 17 wherein said additional blowing agent is a physical blowing agent comprising methylene chloride.

20. The method of claim 17 wherein said additional blowing agent is a physical blowing agent comprising water.

21. The method of claim 1 wherein said blowing agent and said decomposition catalyst provide gases comprising carbon dioxide as substantially the sole blowing agent to produce said foam.

22. The method of claim 1 wherein said polymer system comprises at least one polyurethane.

23. The method of claim 1 wherein said polymer system comprises at least one unsaturated polyester.

24. The method of claim 1 wherein said polymer system comprises at least one polyisocyanurate.

25. The method of claim 1 wherein said polymer system comprises at least one phenolic resole resin.

26. The method of claim 1 wherein said polymer system comprises at least one epoxy resin.

27. The method of claim 1 wherein said polymer system comprises at least one poly(imide-urethane).

28. The method of claim 1 wherein the polymeric foam is deposited upon a surface or in an unconfined mold.

29. A method of producing polymeric foams wherein at least one of the blowing agents used is a catalyzed blowing agent capable of generating carbon dioxide gas at about room temperature, said method comprising the steps of:
(a) providing a crosslinking polymer system comprising at least one polyurethane and incorporating at least one blowing agent comprising a dicarbonate having alkyl substituent end groups;
(b) combining said dicarbonate compound with at least one dicarbonate decomposition catalyst comprising a tertiary amine having at least one sterically accessible nitrogen which exhibits nucleophilicity; and
(c) using the combination of said blowing agent and said decomposition catalyst to initiate the generation of carbon dioxide gas at about room temperature to produce said foam, wherein
(d) sufficient water is present in or added to said polymer system to increase and/or accelerate the generation of said carbon dioxide gas.

30. The method of claim 29 wherein said crosslinking polymer system comprises at least one filler.

31. The method of claim 29 wherein the polymeric foam is deposited upon a surface or in an unconfined mold.

32. The method of claim 29 wherein said blowing agent and said decomposition catalyst provide gases comprising carbon dioxide as substantially the sole blowing agent to produce said foam.

* * * * *